United States Patent [19]

Fick

[11] Patent Number: 5,007,566
[45] Date of Patent: Apr. 16, 1991

[54] WATER BOTTLE INSULATOR

[75] Inventor: Larry D. Fick, Dallas, Tex.

[73] Assignee: New Visions Corporation, Dallas, Tex.

[21] Appl. No.: 398,009

[22] Filed: Aug. 24, 1989

[51] Int. Cl.$^5$ .............................................. B62J 7/00
[52] U.S. Cl. ................... 224/32 R; 224/30 R; 224/39
[58] Field of Search ............... 224/901, 32 R, 35, 39, 224/148, 30 R; 215/131; 211/71, 72, 74, 76, 84, 85

[56] References Cited

U.S. PATENT DOCUMENTS

| | | | |
|---|---|---|---|
| 4,282,279 | 8/1981 | Strickland | 224/32 R |
| 4,401,245 | 8/1983 | Zills | 224/148 |
| 4,478,265 | 10/1984 | DeMarco | 150/52 R |
| 4,754,902 | 7/1988 | Opfergelt | 224/41 |
| 4,883,205 | 11/1989 | Saelens et al. | 224/32 R |

*Primary Examiner*—Henry J. Recla
*Assistant Examiner*—David J. Walczak
*Attorney, Agent, or Firm*—Baker & Botts

[57] ABSTRACT

An insulating device (10) for a bicycle water bottle (28) comprises a cylindrical sidewall (12) and a bottom (32). A slit runs down the sidewall (12) to allow the insulating device (10) to be fitted around a bottle (28) and cage (30). A strapping mechanism (20, 22, 24 and 26) is used to hold the slit closed and to attach the insulating device (10) adjacent the cage (30).

17 Claims, 1 Drawing Sheet

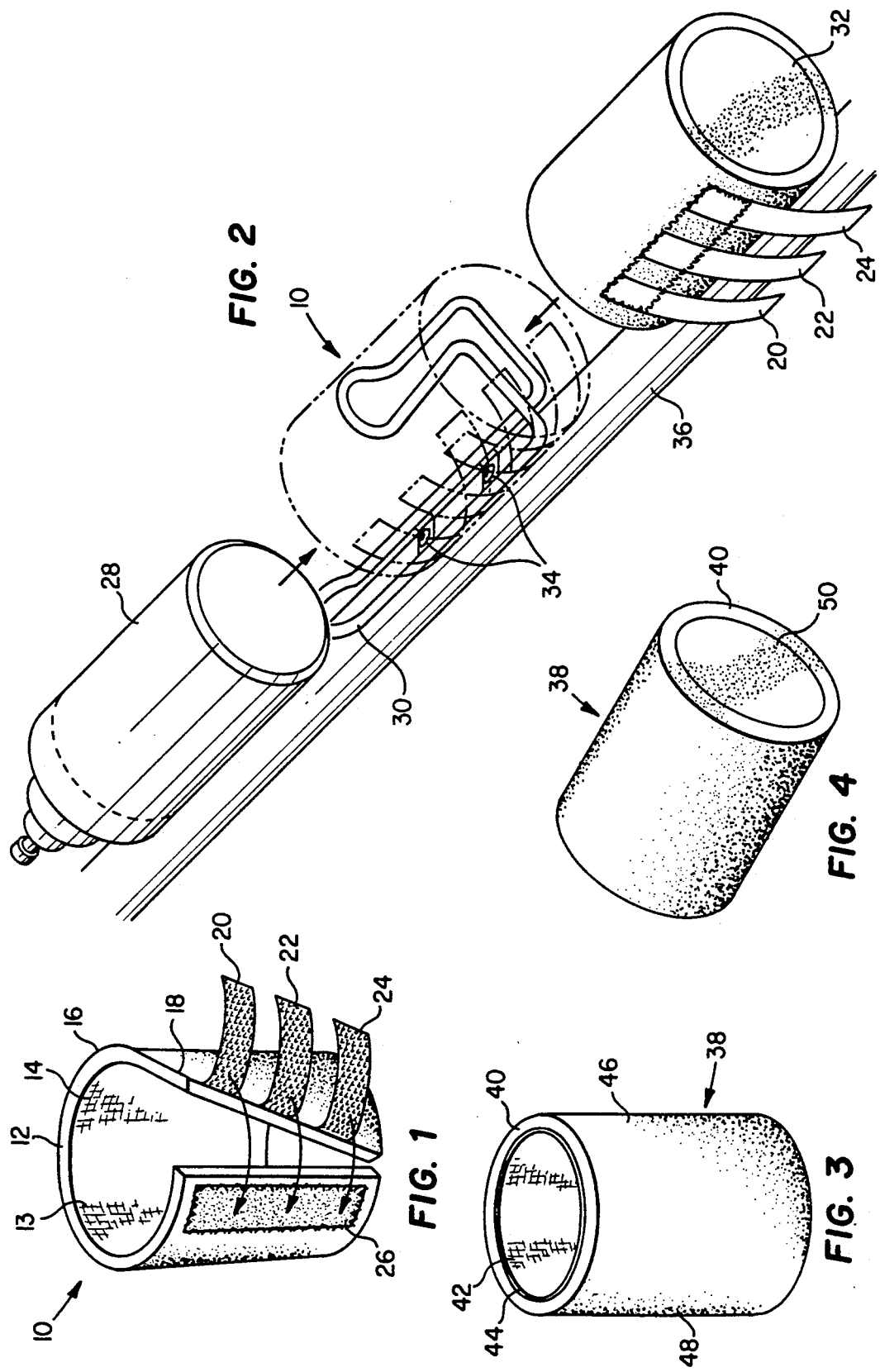

WATER BOTTLE INSULATOR

TECHNICAL FIELD OF THE INVENTION

The present invention relates to a beverage container insulator, and more particularly to a bicycle water bottle insulator.

BACKGROUND OF THE INVENTION

As the populace of the world has become more health conscious, greater numbers of people have realized they need daily cardiovascular exercise. With this realization, many people have taken up the sport of bicycling. Many of these same people have desired a cold or hot beverage while on their rides. In response to this need, entrepreneurs have developed water bottles and cages for carrying the bottles; but keeping the beverages therein cold on warm summer afternoons or hot on brisk winter days has presented a problem.

Many solutions have been suggested to this problem. For example, some cyclists begin their rides with completely frozen bottles of water, while others use a bottle with a thick insulating wall and put this inside a specialized cage for retaining the bottle. Each of these prior art solutions, however, has its drawbacks: in thin wall containers, the ice either melts too fast or does not melt fast enough, and the use of the thick prior art insulator uses up precious space that could be used for fluid.

Another conventional solution has been to provide a separate insulating jacket for disposal inside the water bottle cage. However, any water bottle used with such a jacket must be of commensurately smaller volume. An additional problem with the idea of an insulating jacket that rests within the cage is that insertion and extraction of the bottle into and out of the jacket insulator can be difficult.

Thus, a need has arisen for a water bottle insulator that: (1) does not take up valuable fluid space; (2) is effective in maintaining the beverage in a water bottle at substantially the same temperature despite the outside environment; and (3) allows for easy insertion and extraction of the bottle to and from the insulator cavity.

SUMMARY OF THE INVENTION

In accordance with the present invention, a beverage container insulator is provided which (1) is thin, (2) is effective in keeping the beverage container insulated from the warm or cold air around it, and (3) allows for easy insertion to and extraction from the insulator cavity. According to one aspect of the present invention, a bicycle water bottle insulator is presented which comprises a cylindrical sidewall and a bottom, each having a thin insulating layer. The cylindrical sidewall has an opening for allowing the insulator to be fitted around the bicycle water bottle and cage assembly. The insulator is also capable of being secured to the bicycle cage.

In a preferred embodiment of the invention, the insulator side and bottom walls are made of a three layered material. The middle layer is made of neoprene rubber foam and is $\frac{1}{4} \pm 1/16$ inches thick. The inner layer is made of a relatively slippery fabric such as nylon or Lycra, and the outer layer is made of some thin, durable fabric such as nylon, polyester or Lycra. The inner and outer layers may also be dyed various colors.

One advantageous property of this three layered, fabric-neoprene-fabric material is that it is flexible, yet rigid enough to hold a shape, unlike an insulator made from just fabric. The rigidity of the insulator is useful to a cyclist when he or she tries to insert a water bottle into the cavity while moving at a fairly high rate of speed.

Also, in a preferred embodiment of the invention, a slit is made to run down the length of the sidewall, parallel to the axis of the cylinder. A strapping mechanism is then attached to the outer surface of the cylinder which allows the slit to be held tightly closed, while at the same time allowing the cage-to-bicycle attachment apparatus to project through the enclosure. An example of a strapping mechanism that will perform the above task is a plurality of Velcro straps. The straps must be positioned appropriately on the outer surface of the insulator so that the cage-to-bicycle attachment apparatus can fit through the slit in the sidewall.

BRIEF DESCRIPTION OF THE DRAWINGS

Various aspects of the invention and their advantages will be more completely understood by reference to the following Detailed Description in conjunction with the appended drawings in which:

FIG. 1 is a front isometric view of the preferred embodiment of the invention showing a closure mechanism thereof in an open position;

FIG. 2 is an isometric, exploded-assembly view of an insulator according to the invention, as shown with a water bottle and a water bottle cage, the positioning of the insulator while in use being shown in phantom;

FIG. 3 is a frontal isometric view of an alternative embodiment of the invention; and FIG. 4 is a bottom isometric view of the alternative embodiment of FIG. 3.

DETAILED DESCRIPTION OF THE INVENTION

Referring first to FIG. 1, a front isometric view of an insulating device according to the invention is shown. The insulating device is indicated generally at 10. The insulating device 10 has a cylindrical sidewall 12, preferably of fabric-faced neoprene rubber foam, between 3/16 and 5/16 inches thick, constructed in a manner similar to that for constructing a wetsuit. The sidewall 12 has an interior face 13 faced with a fabric layer 14. The fabric layer 14 may be made of a thin, relatively slippery material, like nylon or Lycra. Preferably, an exterior face 16 of the sidewall 12 has a fabric layer 18 that is made of a thin durable material like nylon, polyester, or Lycra. Both the fabric layers 14 and 18 may be dyed various colors, the combinations of which may be chosen to be attractive to the consumer. Also shown are the Velcro straps 20, 22, and 24 and the Velcro strap receiver 26, which together are used to close the insulating device 10 around a water bottle 28 and bottle cage 30 (see FIG. 2).

Referring now to FIG. 2, an isometric, exploded-assembly view of an insulator according to the invention is shown. Also shown are a water bottle 28, a water bottle cage 30, and the positioning of the insulator 10 while in use, in phantom. The insulating device 10 has a disk-shaped bottom piece 32. The disk-shaped bottom piece 32 is attached to the cylindrical sidewall 12 by glue or stitching. The cylindrical sidewall 12 is formed from a rectangular piece of fabric-faced neoprene rubber foam which at one end is wrapped around the disk-shaped bottom piece 32 so as to leave a slit running the length of the cylindrical sidewall 12. The rectangular piece used to form the cylindrical sidewall 12 has a width which is slightly less than the circumference of the disk-shaped bottom piece 32.

Before the cylindrical sidewall 12 and disk-shaped bottom piece 32 are attached to one another, the Velcro strap receiver 26 and Velcro straps 20, 22 and 24 are stitched onto the cylindrical sidewall 12 on opposite edges of the slit. The Velcro strap receiver 26 is attached so that it runs along substantially the full length of the slit of the cylindrical sidewall 12. The Velcro straps 20, 22 and 24 are attached on the other edge of the slit and positioned so that when the insulating device 10 is wrapped around the bottle cage 30, the Velcro strap 20 is above both of the attachment bolts 34, the Velcro strap 22 is between the attachment bolts 34, and the Velcro strap 24 is below the attachment bolts 34. The gaps between the Velcro straps 20, 22 and 24 allow for the attachment bolts 34 to project through the slit in the cylindrical sidewall 12 so that the bottle cage 30 may be substantially insulated while remaining coupled to the bicycle frame 36.

Referring now to FIG. 3, a frontal isometric view of a beverage container insulator according to an alternate embodiment of the invention is shown. The beverage container insulator is indicated generally at 38. The beverage container insulator 38 has a cylindrical sidewall 40 of fabric-faced neoprene rubber, preferably between 3/16 and 5/16 inches thick, constructed after the manner of a wetsuit. The sidewall 40 has an interior face 42 faced with a fabric layer 44. The fabric layer 44 is made of a thin, relatively slippery material like nylon or Lycra. Preferably, an exterior face 46 of the sidewall 38 has a fabric layer 48 that is made of a thin, durable material like nylon, polyester, or Lycra. Both of the fabric layers 44 and 48 may be dyed various colors, the combinations of which may be chosen to be attractive to the consumer.

Referring now to FIG. 4, a bottom isometric view of the beverage container insulator of FIG. 3 is shown. The beverage container insulator 38 has a disk-shaped bottom piece 50. The disk-shaped bottom piece 50 is attached to the cylindrical sidewall 40 by glue or stitching. The cylindrical sidewall 40 is formed from a length of fabric-faced neoprene rubber foam tubing with an inner diameter substantially equal to the diameter of the disk-shaped bottom piece 50. A peripheral margin of the disk-shaped bottom piece 50 is attached to a bottom margin of the cylindrical sidewall 40. The disk-shaped bottom piece 50 is preferably of similar thickness and fabric content as the composite cylinder sidewall 40.

Although the present invention has been described in detail, it should be understood that various changes, substitutions and alterations can be made hereto without departing from the spirit and scope of the invention as defined by the appended claims.

What is claimed is:

1. A bicycle water bottle insulator, comprising:
    a substantially cylindrical sidewall sized to be fit around a bicycle water bottle cage and having an insulating layer;
    a bottom having an insulating layer and a peripheral margin, a bottom margin of said cylindrical sidewall affixed to said peripheral margin, said cylindrical sidewall having a top margin opposed to said bottom margin;
    said cylindrical sidewall having a slit longitudinally extending from said top margin toward said bottom margin for permitting said insulator to be fitted around a bicycle water cage and a bicycle water bottle, said bicycle water bottle cage having attachments for positioning said cage on a bicycle frame, said slit of said sidewall adapted to receive said attachments;
    a plurality of transverse straps having first ends affixed to said cylindrical sidewall and spaced from each other, said straps longitudinally positioned so that when said insulator is fit around said bottle cage and said attachment bolts are received into said slit, said straps are longitudinally displaced from said attachments and are operable to be passed between said cage, second, free ends of said straps opposed to said first ends; and
    means for fastening said second ends to said cylindrical sidewall operable to fasten each second end to a point across said slit from a respective first end.

2. The bicycle water bottle insulator of claim 1, wherein said cylindrical sidewall is made of a material comprising:
    a first, flexible shape-holding insulating layer; and
    a second layer disposed interiorly of said first layer and made of a relatively slippery fabric for decreasing the friction between said insulator and said bottle.

3. The bicycle water bottle insulator of claim 2, wherein said material forming said cylindrical sidewall further includes a third layer disposed exteriorly of said first layer and made of a durable fabric.

4. The bicycle water bottle insulator of claim 3, wherein said durable fabric is selected from the group consisting of nylon, polyester, Lycra and mixtures thereof.

5. The bicycle water bottle insulator of claim 2, wherein said second layer is made of a slippery fabric selected from the group consisting of nylon, Lycra and mixtures thereof.

6. The bicycle water bottle insulator of claim 2, wherein said bottom is made of the same material as said cylindrical sidewall.

7. The bicycle water bottle insulator of claim 1, wherein said bottom margin and said peripheral margin are affixed to one another by glue.

8. The bicycle water bottle insulator of claim 1, wherein said bottom margin and said peripheral margin are affixed to one another by stitching.

9. The bicycle water bottle insulator of claim 1, wherein said cylindrical sidewall is formed about an axis, said slit running substantially parallel to said axis.

10. The bicycle water bottle insulator of claim 1, wherein said means for fastening comprises:
    a Velcro strap receiver affixed to said cylindrical sidewall on one side of said slit; and
    said straps being a plurality of Velcro straps affixed to said cylindrical sidewall and operable to be passed outwardly of said cage and affixed to said Velcro strap receiver.

11. The bicycle water bottle insulator of claim 10, wherein said bicycle water cage has attachment bolts for affixing said cage to a bicycle frame, and said Velcro straps are positioned so that when said insulator is pulled up around said bottle cage and the bicycle-to-cage attachment bolts wedge in said opening, said straps fit between said bicycle frame and said cage, and may be connected to said Velcro strap receiver in order to hold said insulator around said cage.

12. The bicycle water bottle insulator of claim 11, wherein said straps are positioned so that there exists gaps between the straps through which said attachment bolts may project.

13. A bicycle water bottle insulator, comprising:
a substantially cylindrical sidewall sized to fit around a bicycle water bottle cage;
a bottom having a peripheral margin, a bottom margin of said sidewall affixed to said peripheral margin;
a relatively thin outer layer of said cylindrical sidewall and said bottom comprising a durable fabric selected from the group consisting of nylon, polyester and Lycra;
a relatively thick middle layer of said cylindrical sidewall and said bottom made of flexible neoprene rubber foam and having a thickness of about ¼ inch;
a relatively thin inner layer of said cylindrical sidewall made of a slippery fabric selected from the group consisting of nylon and Lycra;
said cylindrical sidewall having a top opening opposed to said bottom, a slit in said sidewall extending longitudinally from said top opening toward said bottom, for permitting said insulator to be fitted around a bicycle water cage and a bicycle water bottle, said bicycle water bottle cage having attachments for affixing said cage on a bicycle frame, said slit adapted to receive said attachments;
a Velcro strap receiver affixed to said cylindrical sidewall on one side of said slit; and
a plurality of transverse Velcro straps longitudinally spaced from each other, first ends of said straps affixed to respective points on said sidewall across said slit from said Velcro receiver, second, free ends of said straps opposed to sid first ends, said straps positioned so that when said insulator is fit around said cage, said attachments are received into said slit, said straps then longitudinally displaced from said attachments and operable to be passed between said bicycle frame and said cage to be affixed to said strap receiver.

14. The bicycle water bottle insulator of claim 13, wherein said inner layer and said outer layer are of colors different from said middle layer.

15. The bicycle water bottle insulator of claim 13, wherein said receiver is affixed near one edge of said slit.

16. The bicycle water bottle insulator of claim 13, wherein said bicycle water cage has attachment bolts for coupling said cage to said bicycle frame, and wherein said Velcro straps are positioned so that when said insulator is pulled up around said bottle cage with the bicycle-to-cage attachment bolts wedged in said slit, said straps fit between said bicycle frame and said cage, and said straps may be connected to said Velcro strap receiver in order to hold said insulator around said cage.

17. The bicycle water bottle insulator of claim 16, wherein said straps are positioned so that there exist gaps between the straps through which said attachment bolts may project.

* * * * *